Feb. 23, 1965     M. L. GREGORY     3,170,422
SOIL AERATOR AND CONDITIONER
Filed Aug. 15, 1963
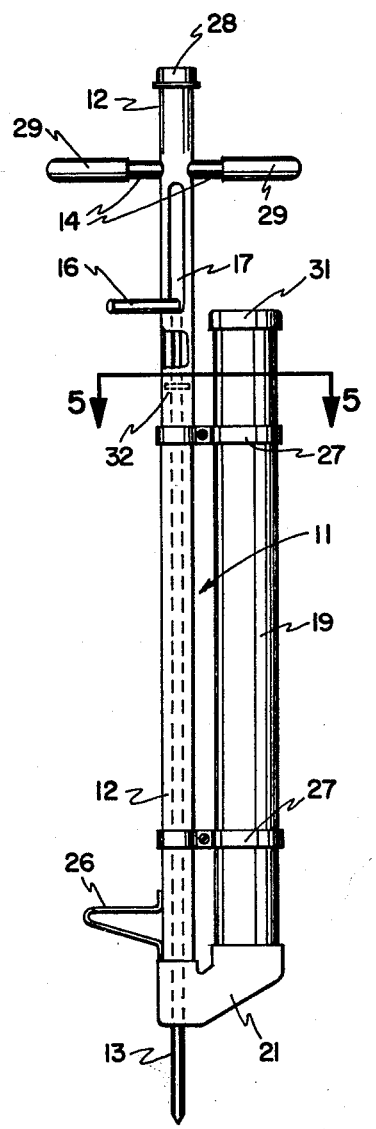
FIG. 1
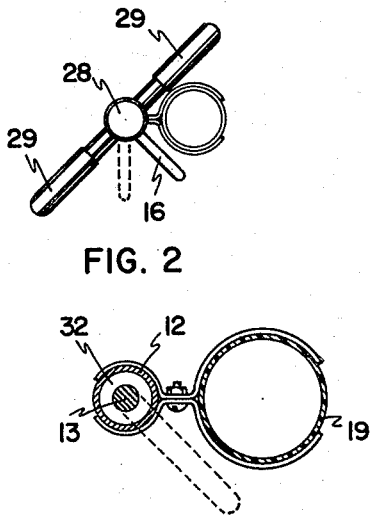
FIG. 2
FIG. 5
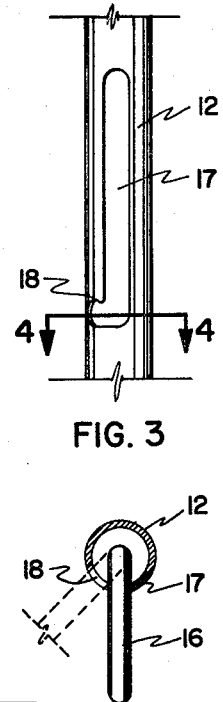
FIG. 3
FIG. 4
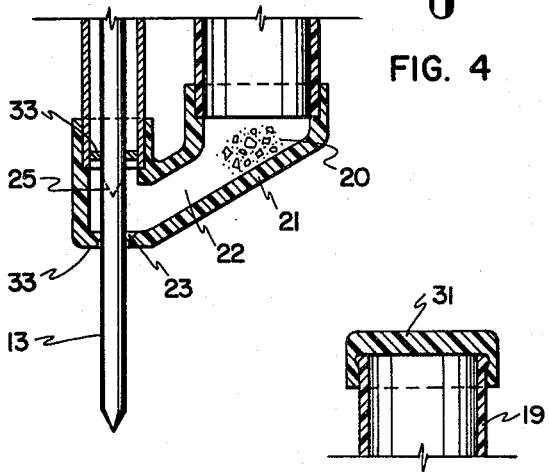
FIG. 6
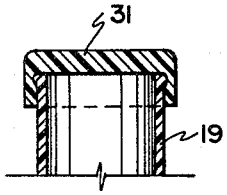
FIG. 7
INVENTOR.
MARVIN L. GREGORY
BY
ATTORNEY 3,170,422
SOIL AERATOR AND CONDITIONER
Marvin L. Gregory, 490 S. Lee St., Lakewood, Colo.
Filed Aug. 15, 1963, Ser. No. 302,236
1 Claim. (Cl. 111—96)

The present invention relates to a lawn aerator and fertilizing device.

The main object of the present invention is to provide a hand tool that serves both to poke holes in the lawn or soil to promote soil aeration and which further is useful to directly apply fertilizer or soil conditioner into the poked hole.

Another object of the invention is to provide an aerating device and soil conditioner in which the aerating rod operates to regulate the application of fertilizers and soil conditioners.

Another object of the present invention is to provide a hand tool of the foregoing type which is sturdy and serviceable and which may be provided economically.

A further objective of the present invention is to provide means whereby the quantity of soil conditioner applied may be visually observed for mechanical regulation in accordance with such observations.

Further objects and advantages of the present invention will be apparent from the appended description and drawings, in which FIG. 1 is a side elevation in partial broken section of the assembled features of an embodiment of the invention, FIG. 2 is a top view of the embodiment shown in FIG. 1 in part showing alternate positions, FIG. 3 is an enlarged detail illustrating a guide and locking slot, FIG. 4 is a cross-sectional plan view taken along the line 4—4 of FIG. 3 with part shown in alternate position, FIG. 5 is a cross-sectional elevation taken along the line 5—5 of FIG. 1, FIG. 6 is a cross-sectional elevation through a bottom transition piece showing the valving operations, and FIG. 7 is a cross-sectional elevation through a supply tube cover element.

Briefly stated, the present invention provides a soil aerating and fertilizing and conditioning hand tool which may be used for the combined purpose of poking holes in a lawn or sod to obtain the benefits of soil aeration and which further provides means for the regulated application of soil conditioners or fertilizers directly into the hole that has been punched for aeration purposes. In such conditioning operations the hole punch rod operates further as a valving mechanism to regulate the introduction of conditioners or fertilizers. The conditioners or fertilizers are carried in a tube mounted on the tool, and visual means are provided for controlling the amount of materials to be applied to the poked hole.

The specific features of a preferred embodiment of the invention are shown in the accompanying figures, where it will be seen that the invention is concerned with the provision of a combined aerator-conditioner 11. This combined hand tool is made up of structural elements, inclusive of a guide slide tube 12, a probe or rod 13 adapted for reciprocal movement within said slide guide tube 12, support handles 14 on said guide tube 12, and an operator handle 16 on the rod 13 and extending through a slot 17 in the tube 12. The slot 17 further provides a slide lock or bolt type catch 18 adapted for reception of the handle 16 when the operator handle is in its lowered position, as shown in FIGURE 1.

Additional major elements of the invention include a materials storage tube 19, which preferably is made of transparent or translucent material, and a lower transition piece 21 which receives the materials tube 19 and the guide tube 12 to provide an intercommunicating passage 22 therebetween for the flow of granular materials 20 placed in the materials tube 19. The lower opening 23 in the transition piece selectively receives the rod 13 when the rod and handle 16 are in the lower position to provide a stop or closure in the nature of a valve for controlling the escape of granular materials 20 out of said materials tube 19 and through the opening 23. When the handle is in its raised position, the rod 13 moves to the alternate position shown by the dotted outline representation identified by the numeral 25 in FIGURE 6. With the rod 13 in this position, any materials 20 in the tube 19 and passage 22 are free to fall through the opening 23.

Further structural elements include a foot pedal 26 welded or otherwise mounted on the guide tube 12; the mounting clips 27 which surround both the guide tube and materials tube 12 and 19, respectively, and provide support for such elements; a top end cap 28 on the guide tube 12; handle grips 29 on the handles 14; and a compression fit closure cap 31 on the top of the materials supply tube 19. The structural assembly further includes a pair of guide washers 32 and 33 disposed respectively at the top and lower end of the guide tube 12 and having central openings therethrough which engage the rod 13 to control the reciprocal movement thereof.

The described mechanism is especially useful in the care of lawns and plants, since the probe rod 13 may be used to poke spaced holes in the soil as necessary to aerate the soil. The function of soil aeration is widely recognized, and the benefits of such operation have been technically and experimentally supported by others. The aerating features of the present invention are similar to prior developments, but it should be noted that the described device makes it possible to incorporate certain improvements in soil aeration techniques.

One benefit of soil aeration is directly concerned with the loosening of otherwise heavy soils so that the roots of grasses and plants will be provided with improved growing conditions. Operation of the presently described device makes it possible to place soil conditioner or fertilizer elements in the holes that have been punctured by a standard aerating operation. Selectively, materials disposed in the tube 19 may be either soil conditioners, such as natural sands or humus materials, or mineral conditioners, such as vermiculite. When these types of materials are placed in the punctured holes, the deposited materials become an integral part of such soil and may tend to permanently loosen and otherwise improve the characteristics of such soil. With the addition of the proper materials (air and moisture), the beneficial effects of soil aeration continue for a longer period of time, since the passageway to lower roots is in part preserved by the emplacement of loose materials. It is believed that the addition of required minerals and soil loosening materials over a period of time could eventually improve the soil conditions to the extent that aeration would no longer be required.

In addition to the introduction of soil conditioners, the present device may be used to apply fertilizers or various combinations of conditioners and fertilizers. With the proper choice of materials the growing conditions for lawns, sod, seed beds, plants, shrubbery and trees may all be improved. In connection with use of this mechanism for the treatment of shrubs and trees, it should be noted that the depth of penetration and the amount of refill materials supplied can all be manually regulated. Accordingly, fertilizer materials may be placed at a desired depth and in a regulated amount as necessary to make such fertilizers directly available to the roots of the plant, tree or shrub being treated.

Use of the mechanism on different types of agricultural and landscape plants and products has indicated that there are many potential uses for the device. In general, all such uses will follow a pattern of manipulative steps, of which the following cycle is illustrative.

Having filled the materials tube 19 with a granular type soil conditioner or fertilizer to a desired level, which can be readily observed through the transparent or at least translucent tube, the cap 31 will be emplaced. With the user holding one or both of the handle grips 29, a foot may be placed on the pedal 26 so that the rod 13, which is in its extended position and located in the catch 18, will be forced downwardly into the soil to puncture a hole. This step can be continued until the bottom face 33 of the transition piece 21 comes into contact with the soil. Next, the handle 16 will be gripped to rotate the rod 13 so that the handle may be retracted along the slot 17. When the lower end of the rod 13 moves out of the valve opening 23, materials will flow through the passage 22 to the opening 23 and down into the hole formed by the rod and now vacated by the retraction of such rod. Observation of a decrease in the level of materials in the tube 19 will enable the operator to know when an adequate amount of materials have been introduced into the hole. At such time the handle 16 will be moved reciprocally in a downward direction, first, to cut off the flow of such materials, and secondly, to move the rod 13 to its extended and locked position for the start of another cycle of operation and the poking of another hole.

The cycle of operation is continued until all of the lawn, sod or soil has been treated as required. The emplacement of gravels, soil conditioners or fertilizers in the poked hole has several potential advantages, and it should be observed that the present mechanism makes the emplacement of such materials quite efficient. The direct application of such materials as the rod is retracted assures proper placement of the materials and avoids the potential collapse or displacement of the hole before a separate filling apparatus could be applied. This benefit is largely dependent upon the provision of a single member which has the dual function of poking the hole and acting as a valve control member.

While one embodiment of the invention incorporating these features has been shown and described, it should be apparent that the features of this invention are adaptable to various modifications and changes. All such modifications and changes are considered to be a part of this invention.

I claim:

A hand and foot operated soil aeration and conditioning tool for poking holes in sod and soil and for the application of loose granular materials into the poked holes comprising a support member, a cross handle extending laterally from said support member adjacent to the top thereof, a reciprocally movable probe supported by said support member having a lower sharpened end for soil engagement, a handle on said probe extending laterally from said support in position adjacent the cross handle of said support member when said probe and handle is in the locked position, a loose materials storage tube of translucent material adjacent said support member, a transition piece communicating with said storage tube for the passage of such loose materials, said transition piece further providing a loose materials valve opening in position aligned with said reciprocating probe, a foot pedal adjacent said transition piece at the lower end of said support member and in radial position with the cross handle of said support member of the application of operator applied foot pressure, said elements being cooperatively arranged whereby the proble is, when extended, useful for poking said holes and for simultaneously closing the passage through said valve opening, and, when retracted, permits the egress of said loose materials out of said storage tube, transition piece and valve opening and into said poked holes, and a lock element on said support member for selectively holding said probe in the extended position whereby thrust forces exerted against said support member are transmitted to said extended probe for poking the desired holes, said handle, cross handle and foot pedal being cooperatively placed whereby an operator's hand may be conveniently placed on one said cross handle with a foot being selectively applied to the foot pedal whereby the desirable reciprocal movement of said probe as energized by the operator's other hand on said probe handle can be resisted selectively by the cross handle of said support member and by the foot pedal thereon.

References Cited in the file of this patent

UNITED STATES PATENTS

| | | |
|---|---|---|
| 2,170,598 | Sims | Aug. 22, 1939 |
| 2,325,939 | Buchler | Aug. 3, 1943 |
| 2,857,864 | Cromer | Oct. 28, 1958 |
| 2,865,315 | Goldstein | Dec. 23, 1958 |

FOREIGN PATENTS

| | | |
|---|---|---|
| 16,645 | Sweden | Jan. 9, 1903 |